(12) United States Patent  (10) Patent No.: US 7,398,903 B2
Ulrich  (45) Date of Patent: Jul. 15, 2008

(54) WIRE-FEEDING DEVICE FOR A WIRE-PROCESSING MACHINE

(75) Inventor: Kurt Ulrich, Stans (CH)

(73) Assignee: Komax Holding AG, Dierikon (CH)

( * ) Notice: Subject to any disclaimer, the term of this patent is extended or adjusted under 35 U.S.C. 154(b) by 324 days.

(21) Appl. No.: 10/927,310

(22) Filed: Aug. 26, 2004

(65) Prior Publication Data

US 2005/0051588 A1 Mar. 10, 2005

(30) Foreign Application Priority Data

Sep. 10, 2003 (EP) .................................. 03405665

(51) Int. Cl.
*B65H 51/30* (2006.01)
(52) U.S. Cl. ............................. 226/24; 226/44; 226/45
(58) Field of Classification Search ...................... 226/1, 226/24, 43, 44, 45; 242/418, 418.1
See application file for complete search history.

(56) References Cited

U.S. PATENT DOCUMENTS

| 2,314,070 | A | * | 3/1943 | Bogoslowsky | ........... 242/155 R |
| 2,681,184 | A | * | 6/1954 | Thomas | .................... 242/417.3 |
| 2,800,326 | A | * | 7/1957 | Berger | .......................... 226/40 |
| 2,825,512 | A | * | 3/1958 | Andren | ..................... 242/420.6 |
| 2,895,489 | A | * | 7/1959 | Foust | ......................... 134/57 R |
| 3,049,308 | A | * | 8/1962 | Lang | ........................ 242/418.1 |
| 3,684,205 | A | * | 8/1972 | Rogow | .................... 242/413.6 |
| 3,974,949 | A | * | 8/1976 | Petersen | ........................ 226/42 |
| 4,422,583 | A | * | 12/1983 | Maxner et al. | ........... 242/418.1 |
| 4,500,043 | A | | 2/1985 | Brown | |
| 5,031,847 | A | * | 7/1991 | Tanaka | ..................... 242/417.3 |
| 5,139,206 | A | * | 8/1992 | Butler | ....................... 242/420.6 |
| 5,195,690 | A | * | 3/1993 | Cross et al. | .................. 242/563 |
| 5,413,264 | A | | 5/1995 | Kotzur et al. | |
| 5,597,105 | A | * | 1/1997 | Keller | ...................... 226/118.3 |

FOREIGN PATENT DOCUMENTS

| DE | 2 036 157 | 1/1972 |
| DE | 33 43 286 | 6/1985 |
| DE | 44 43 503 | 6/1996 |
| EP | 0 255 507 | 2/1988 |
| JP | 10021764 | 1/1998 |
| JP | 04156405 | 5/1998 |

* cited by examiner

*Primary Examiner*—Peter M. Cuomo
*Assistant Examiner*—Scott Haugland
(74) *Attorney, Agent, or Firm*—Fraser Clemens Martin & Miller LLC; William J. Clemens

(57) ABSTRACT

A wire feeding device for very fine wire includes a straightening unit, a transporting unit, a wire buffer, and a wire guide arranged on a table on which a swivel unit with a wire drive is also arranged. The swivel unit serves wire-processing stations of a wire-processing machine. A supply of very fine wire is held in a drum and passes through the straightening unit which straightens the wire, bends and kinks being thereby removed. The transporting unit pulls the wire out of the drum and through the straightening unit and feeds the wire buffer. The wire buffer has a measuring device for monitoring a hanging wire loop. Depending on the requirement for wire in the wire-processing machine, the content of the buffer can decrease and the wire apex of the loop then moves upwards. The movement of the wire apex is detected by the measuring device and controlled with a control device via the transporting unit.

18 Claims, 4 Drawing Sheets

WIRE-FEEDING DEVICE FOR A WIRE-PROCESSING MACHINE

BACKGROUND OF THE INVENTION

The present invention relates to a wire-feeding device for a wire-processing machine, there being provided after a wire supply and before the wire-processing machine a wire buffer which can be fed by a transporting unit, the wire buffer satisfying the requirement for wire of the wire-processing machine.

From German patent application DE 33 43 286 A1 an arrangement for coiling a lightwave conductor has become known. The coiling operation takes place under a constant mechanical tension. The tension is determined by the own weight of the hanging length of conductor and by an additional toroidal weight attached to it. The length of the hanging conductor and the position of the additional weight can be regulated by means of a regulating device and a detecting device. The rotational speed of the coiling reel is controlled in such manner that the length of the hanging conductor remains constant, light barriers arranged one above the other detecting the position of the additional weight.

A disadvantage of the known device is that to avoid hunting elaborate control and mechanical measures are necessary.

SUMMARY OF THE INVENTION

It is here that the present invention sets out to provide a remedy avoiding the disadvantages of the known device and creating an inexpensive device for feeding wires to wire-processing machines. To process wires, the wire-processing machine according to the present invention transports the wire to be processed intermittently and at high speed (about 5 m/s) and with high acceleration (about 5 g). The stepwise requirement for wire of the wire-processing machine cannot be readily met out of a drum or off a reel. For this purpose a feeding device is necessary which assures removal of the wire from the drum or off the reel in wire-compatible manner and which makes the necessary amount of wire available to the wire-processing machine. For example, jerky removal of the wire from the drum would result in wire loops and/or wire knots. Jerky removal of the wire from the reel would cause snapping of the wire with very fine wires. For wires with a diameter of about 0.3 mm and more, controllable wire buffers are normally used as buffers between the wire supply and the wire-processing machine. For very fine wires with a diameter of approximately 0.15 mm the tensile forces on the wire arising on account of the mass of the rotating reels and the mass of the movable reel frame are too high. However, reel diameters cannot be made smaller indefinitely since for processing the wire-ends and for storing the wires straight and kink-free wires are essential.

The advantages achieved by the present invention are essentially to be seen in that the feeding device according to the invention fulfills the processing conditions of the subsequent wire-processing machine with little expense. Provided in the feeding device is a wire-path with free-hanging wire-loop, the hanging length of wire serving as a wire buffer between the wire drum or wire reel and the wire-processing machine. With the free-hanging w ire-loop, even very fine wires remain kink-free and straight even when withdrawn jerkily. With control of the hanging wire-loop, the transporting unit which feeds the hanging wire-loop can be operated largely autonomously. Control of the hanging wire-loop can be realized with simple and inexpensive means. If the length of the hanging wire-loop is too small or too large, the wire-processing machine can adjust the parameters of the transporting unit. The stepwise requirement for wire of the wire-processing machine can be met with the free-hanging wire-loop.

The wire-feeder according to the present invention prevents the hanging wire-loop of very fine wires from being able to adhere to machine parts through static charging.

Also advantageous is the space-saving arrangement of the feeding device according to the present invention. The plane occupied by the feeding device stands perpendicular to the longitudinal axis of the wire-processing machine. Thus the overall length of the machine is increased only insignificantly.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
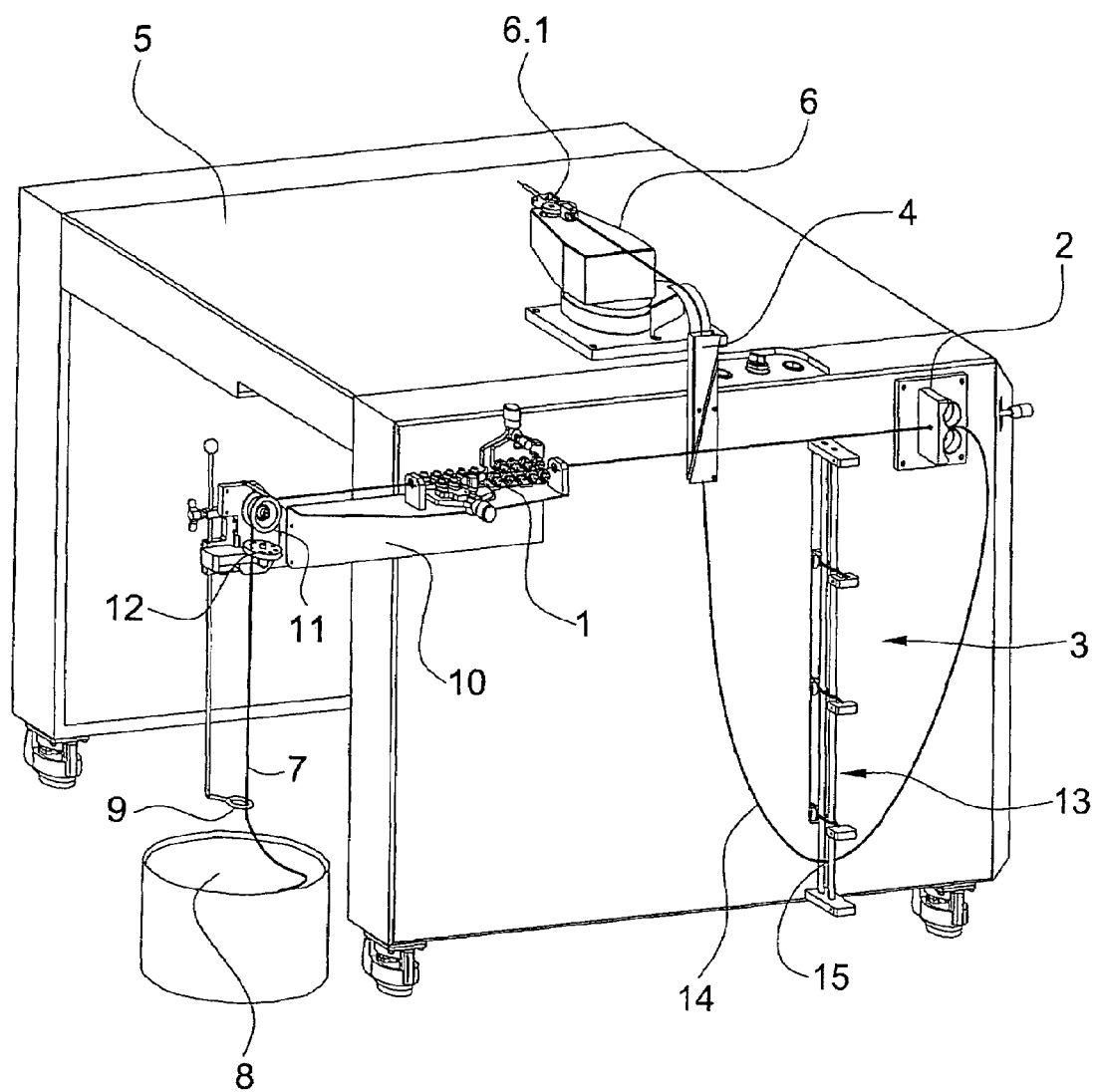
FIG. 1 is perspective view of a device for feeding wires according to the present invention.

FIG. 1 shows a device for feeding wires according to the present invention including straightening device 1, a transporting device 2, a wire buffer 3, and a wire guide 4. The device is arranged on a table 5 on which a swivel unit 6 with a wire drive 6.1 is also arranged. The swivel unit 6 serves not-shown wire-processing stations of a wire-processing machine. A fine to very fine wire designated 7 is held in store in a supply drum 8. The wire store may also be in the form of a wire reel. The wire 7 is guided through a height-adjustable eye 9 that prevents the wire from swinging when the wire is withdrawn. A diverter pulley 11 arranged on a supporting bracket 10 of the straightening unit 1 realigns the wire 7 from the vertical to the horizontal, there being arranged before the diverter pulley 11 a wire-knot detector 12. Subsequently, the wire 7 passes through the straightening unit 1, which straightens the wire, bends and kinks being removed. The transporting unit 2 pulls the wire 7 out of the drum 8 and through the straightening unit 1 and feeds the wire buffer 3. The wire buffer 3 essentially comprises a measuring device 13 for monitoring a hanging wire-loop or freely hanging length of wire 14. Essentially, the hanging wire-loop 14 forms an upwardly open parabola with a wire apex 15 and is bounded at opposed ends by the transporting unit 2 and the wire guide 4. Shown in FIG. 1 is the maximum free-hanging wire-length 14 and therefore the maximum wire buffer capacity. Depending on the requirement for wire in the wire-processing machine, the content of the buffer can decrease, the wire apex 15 then moves upward. The movement of the wire apex 15 is detected by the measuring device 13 and by means of a not-shown control device controlled by the transporting unit 2. The path of wire shown occupies a plane that stands perpendicular to the longitudinal axis of the wire-processing machine. The wire guide 4 realigns the wire 7 from this plane into the direction of the longitudinal axis of the wire-processing machine.

Figure 2:
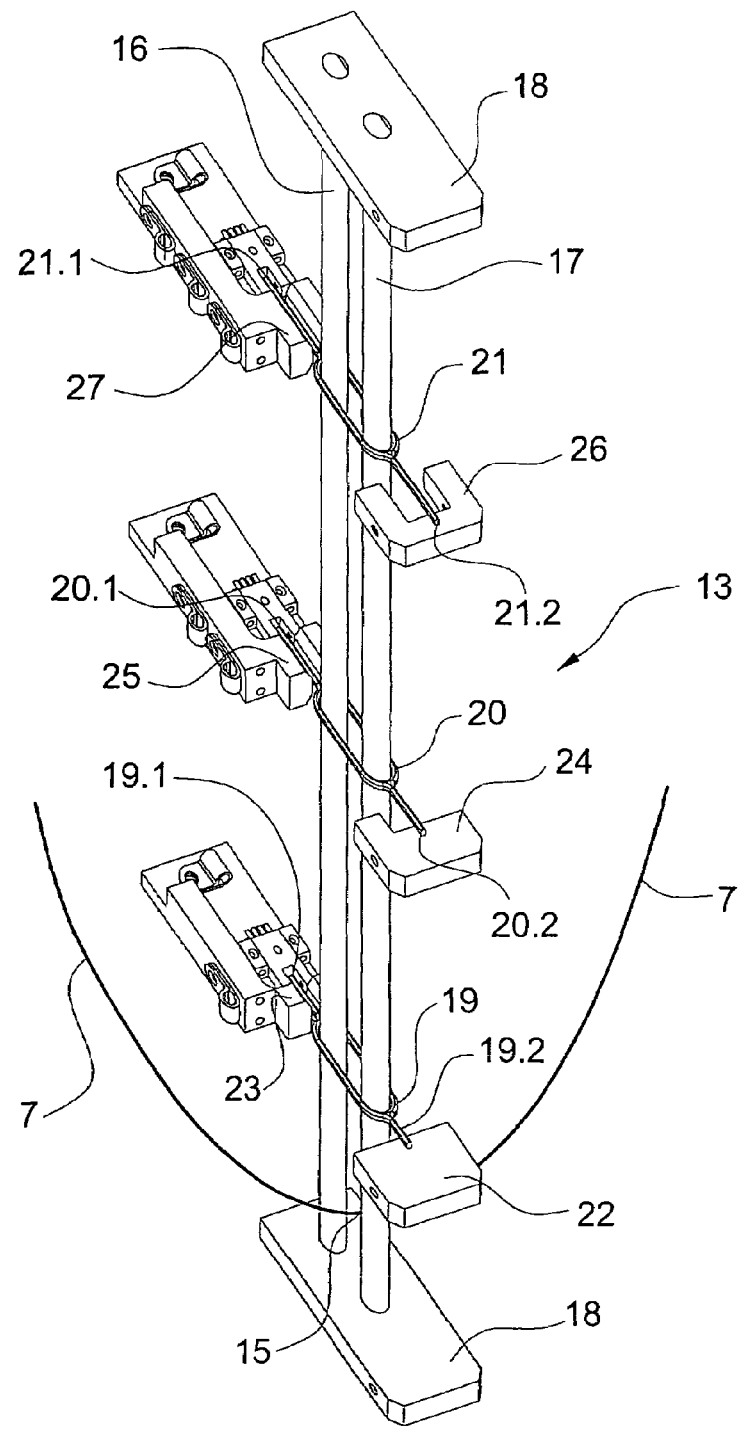
FIG. 2 is an enlarged perspective view of the measuring device of the wire buffer shown in FIG. 1

FIG. 2 shows details of the measuring device 13 of the wire buffer 3. The measuring device 13 has a first column 16 and a second column 17, each column at each end being held by a holding device 18. The free-hanging wire length 14 passes between the columns 16, 17. The columns 16, 17 guide several runners along a path of movement. Provided in the example shown are a first or lower runner 19, a second or middle runner 20, and a third or upper runner 21. Two, or more than three, runners are also possible. Each runner has an arm for each column. Oppositely extending arms 19.1, 19.2 of the first runner 19 are shorter than oppositely extending arms 20.1, 20.2 of the second runner 20, and the arms 20.1, 20.2 of the second runner 20 are shorter than oppositely extending arms 21.1, 21.2 of the third runner 21. Each runner rests on a support and on a light-barrier. The first runner 19 rests on a first support 22 and on a first light-barrier 23 at a first predetermined position along the path. The first light-barrier 23 detects the arm 19.1. The second runner 20 rests on a second support 24 and on a second light barrier 25 at a second predetermined position along the path. The second light-barrier 25 detects the support 20.1. The third runner 21 rests on a third support 26 and on a third light barrier 27 at a third predetermined position along the path. The third light-barrier 27 detects the arm 21.1. The length of the arms is so made that the respective runner can be moved past the higher arms and the higher light-barriers. The first runner 19 (at a first level formed by the support 22 and the light-barrier 23) can be moved through second and third levels. The second runner 20 (the second level being formed by the support 24 and the light-beam 25) can be moved through the third level (formed by the support 26 and the light-barrier 27). The runners 19, 20, 21 are moved up and down by the moving wire apex 15. For very fine wires 7 the runners 19, 20, 21 weigh about 10 g in total. The runners 19, 20, 21 also prevent the wire 7 from adhering electrostatically to the columns 16, 17 or to parts of the table 5.

Figure 3:
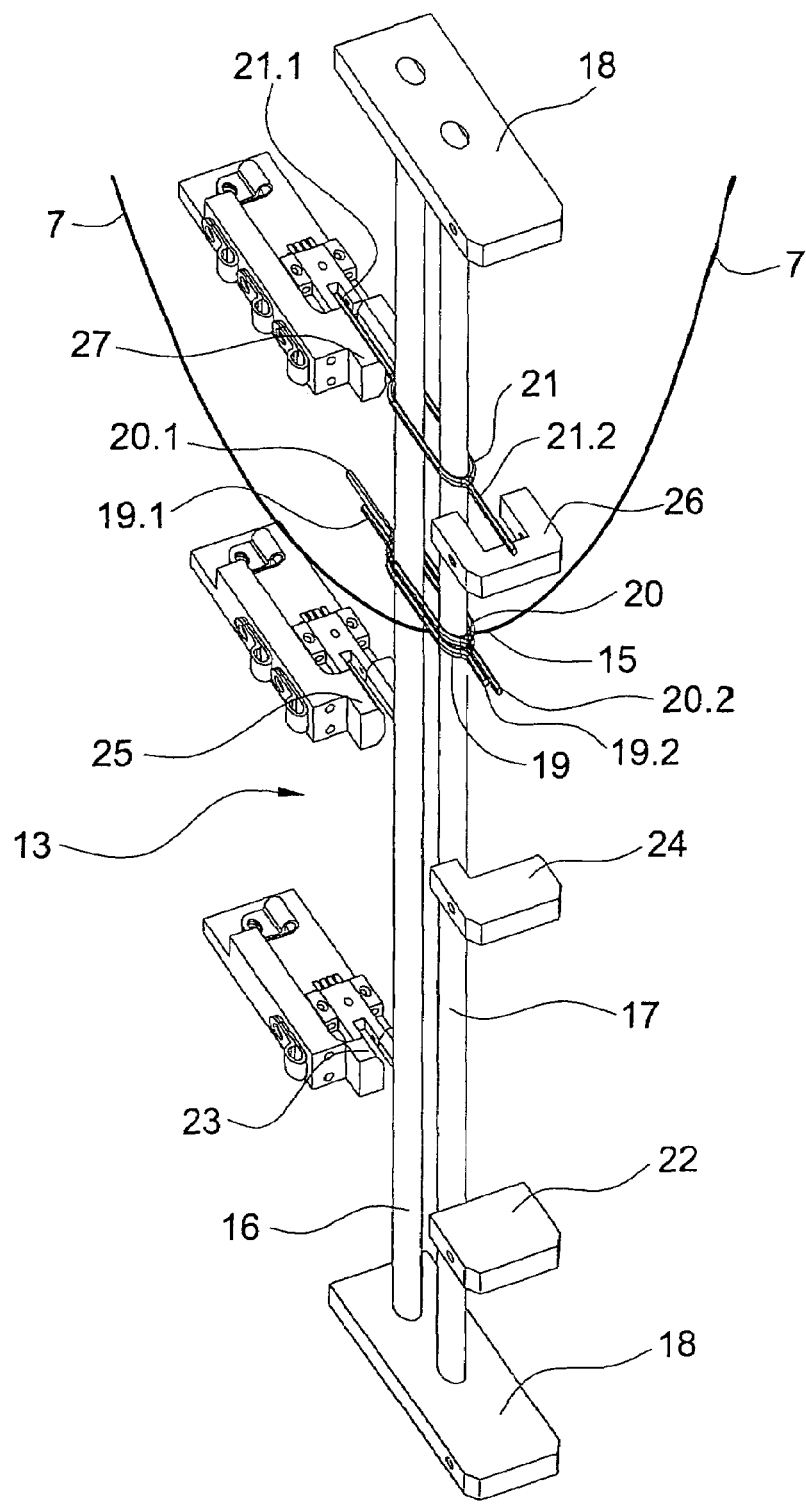
FIG. 3 is a perspective view similar to FIG. 2 showing the manner of functioning of the measuring device.

Signals generated by the light-barriers 23, 25, 27 are transmitted to the not-shown control device which controls the transporting unit 2. In the position of the wire apex 15 shown in FIG. 2, the transporting unit 2 is not activated and the transporting unit 2 is not feeding the wire buffer 3. Should the wire-processing machine now have a requirement for wire 7, the wire apex 15 moves upwards, the first runner 19 being lifted out of the first light-barrier 23. With the signal (absence of wire) from the first light-barrier 23 the transporting unit 2 is switched to level "1" (for example 80% of an average wire-transporting speed). Should the wire 7 fed into the wire buffer 3 not satisfy the requirement for wire of the wire-processing machine, the wire apex 15 moves further up and lifts the second runner 20 out of the second light-barrier 25 as shown in FIG. 3. With the signal (absence of wire) from the second light-barrier 25, the transporting unit 2 is switched to level "2" (for example 120% of a medium wire transporting speed). Should the wire 7 fed into the wire buffer 3 not satisfy the requirement for wire of the wire-processing machine, the wire apex 15 moves further up and lifts the third runner 21 out from the third light-barrier 27. With the signal (absence of wire) from the third light-barrier 27, the transporting unit 2 and the wire-processing machine are switched off.

Should, for example, the transporting unit 2 be switched to level "2" and should more wire 7 be fed to the wire buffer 3 than the requirement for wire of the wire-processing machine, the wire apex 15 falls and deposits the second runner 20 in the second light-barrier 25. With the signal (presence of wire) of the second light-barrier 25 the transport-unit 2 is switched to level "1". A similar operation applies for the first runner 19 and the first light-barrier 23.

The individual speed levels of the transporting unit 2 can also be influenced by the control of the wire-processing machine. Depending on the processing program of the wire-processing machine, the wire speed of the transporting unit 2 in the respective level can be adapted.

Figure 4:
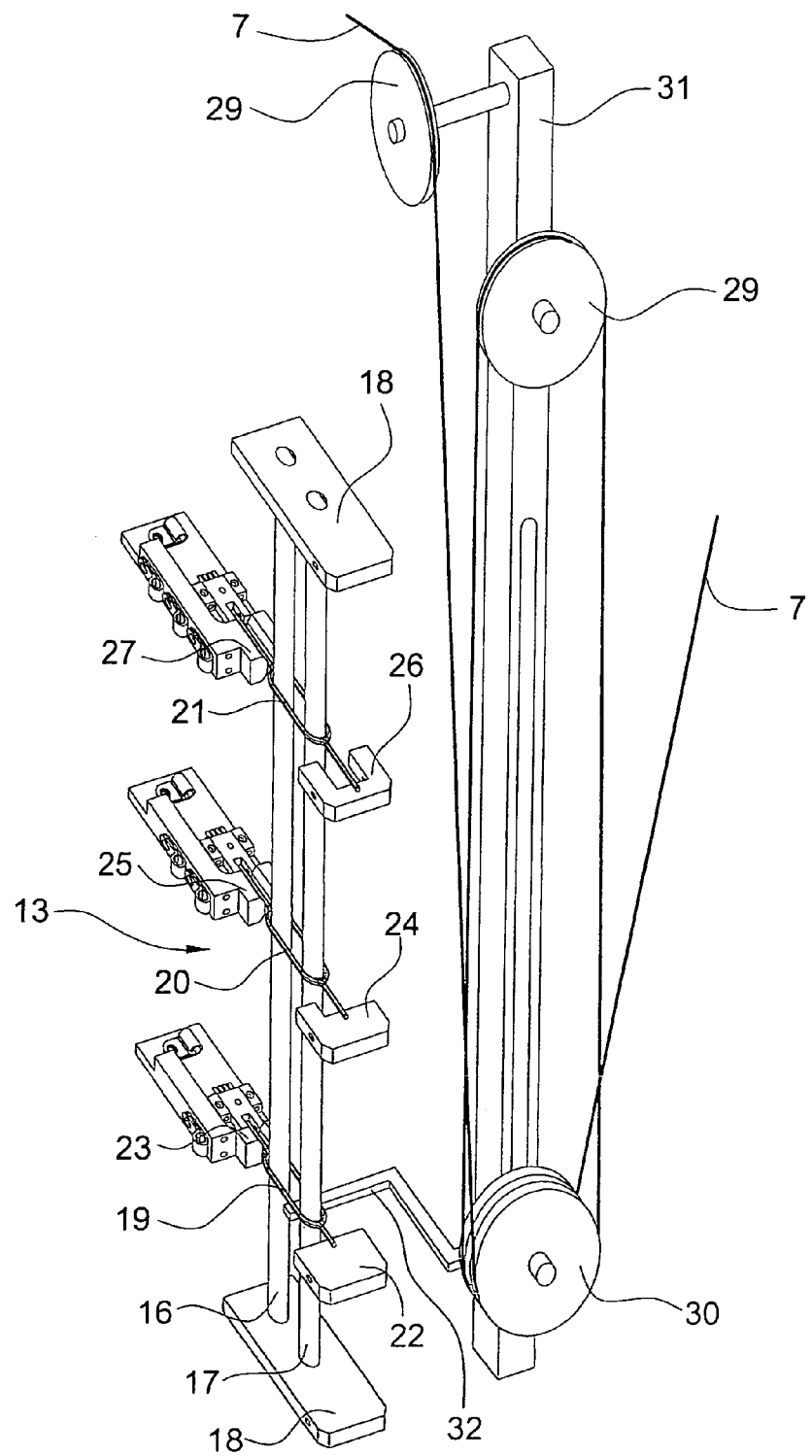
FIG. 4 is a perspective view of the measuring device shown in FIG. 2 used with a reel supply.

FIG. 4 shows the wire buffer 3 associated with pulleys 29, 30 based on the principle of the block-and-tackle, the measuring device 13 being used to detect the position of the mobile pulley 30 which has at least one wire-level. The pulleys 29, 30 with at least one wire level are arranged on a stand 31, the mobile pulley 30 being movable vertically along the stand 31. The content of the buffer adapts itself to the position of the mobile pulley 30. A finger 32 arranged on the mobile pulley 30 serves the runners 19, 20, 21. The manner of functioning of the measuring device 13 and of the transporting unit 2 is analogous to that described above.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wire-feeding device for feeding wire from a wire supply to a wire-processing machine, the device including a wire buffer being fed the wire from the wire supply by a transporting unit, the wire buffer comprising:

a first runner and at least a second runner movable along a common path by the wire in the wire buffer, said first runner being movable alone a portion of the path independent of said second runner; and a first sensor and a second sensor, said first sensor generating a first signal representing a presence at a first predetermined position for said first runner along the path and a second signal representing an absence of said first runner at the first predetermined position and said second sensor generating a first signal representing a presence at a second predetermined position for said second runner along the path and a second signal representing an absence of said second runner at the second predetermined position, the transporting unit being controlled in response to said sensor signals.

2. The wire-feeding device according to claim 1 wherein each of said first and second runners is guided on a pair of columns extending along the path and has a pair of arms extending transverse to the path, a length of said arms of said first runner being different than a length of said arms of said second runner.

3. The wire-feeding device according to claim 2 including a first support and a second support, said first support for engaging one of said arms of said first runner to stop said first runner at said first predetermined position along the path and said second support for engaging one of said arms of said second runner to stop said second runner at said second predetermined position along the path.

4. The wire-feeding device according to claim 2 wherein each of said first and second sensors is a light-barrier actuated by one of said arms of said first and second runners respectively moving in and out of said light-barrier.

5. The wire-feeding device according to claim 4 including a first support and a second support, said fast support for engaging one of said arms of said first runner to stop said first runner in said first sensor light barrier and said second support for engaging one of said arms of said second runner to stop said second runner in said second sensor light-barrier.

6. The wire-feeding device according to claim 1 wherein said first and second runners are moved along the path by engagement with a free-hanging wire-loop having a wire apex formed by the wire.

7. The wire-feeding device according to claim 1 including at least one fixed pulley and at least one mobile pulley, said mobile pulley being moved by engagement with the wire and said first and second runners being moved along the path by engagement with said mobile policy.

8. The wire-feeding device according to claim 7 including a finger extending from said mobile pulley for engagement with said first and second runners.

9. A wire-feeding device for feeding wire from a wire supply to a wire-processing machine comprising:
 a wire buffer having at least first and second runners movable along a common path, said first runner being movable along a portion of the path independent of said second runner;
 a first sensor associated with said first runner for generating a signal representing a first predetermined position of said first runner along the path and a second sensor associated with said second runner for generating a signal representing a second predetermined position of said second runner along the path; and
 a transporting unit for feeding wire to said wire buffer and being controlled in response to said first and second sensor signals, said first and second runners being moved by the wire in said wire buffer.

10. The wire-feeding device according to claim 9 wherein each of said first and second runners is guided on a pair of columns extending along the path and has a pair of arms extending transverse to the path, a length of said arms of said first runner being different than a length of said arms of said second runner.

11. The wire-feeding device according to claim 10 including a first support and a second support, said first support for engaging one of said arms of said first runner to stop said first runner at said first predetermined position along the path and said second support for engaging one of said arms of said second runner to stop said second runner at said second predetermined position along the path.

12. The wire-feeding device according to claim 10 wherein said first and second sensors are a light-barrier actuated by one of said arms of said first and second runners respectively moving in and out of said light-barrier.

13. The wire-feeding device according to claim 12 including first and second supports associated with said first and second runners respectively for engaging another one of said arms of said first and second runners respectively to stop said first and second runners in said light-barrier.

14. The wire-feeding device according to claim 9 wherein said first and second runners are moved along the path by engagement with a free-hanging wire-loop having a wire apex formed by the wire.

15. The wire-feeding device according to claim 9 including at least one fixed pulley and at least one mobile pulley, said mobile pulley being moved by engagement with the wire and said first and second runners being moved along the path by engagement with said mobile pulley.

16. The wire-feeding device according to claim 15 including a finger extending from said mobile pulley for engagement with said first and second runners.

17. The wire-feeding device according to claim 15 including a stand mounting said at least one fixed pulley and said mobile pulley, said stand guiding said mobile pulley for movement generally parallel to the path.

18. A wire-feeding device for feeding wire from a wire supply to a wire-processing machine comprising:
 a wire buffer having a first runner and at least a second runner movable along a path, each of said first and second runners being guided on a pair of columns extending along the path and having a pair of arms extending transverse to the path, a length of said arms of said first runner being different than a length of said arms of said second runner;
 a first light-barrier associated with said first runner and being actuated by one of said arms of said first runner moving in and out of said first light-barrier for generating a signal representing said first runner at a first position along the path and a second light-barrier associated with said second runner and being actuated by one of said arms of said second runner moving in and out of said second light-barrier for generating a signal representing said second runner at a second position along the path;
 a first support associated with said first runner for engaging another one of said arms of said first runner to stop said first runner in said first light-barrier and a second support associated with said second runner for engaging another one of said arms of said second runner to stop said second runner in said second light-barrier; and
 a transporting unit for feeding wire to said wire buffer and being controlled in response to said signals generated by said first and second light-barriers.

* * * * *